United States Patent [19]

Rabideau

[11] Patent Number: 4,858,367
[45] Date of Patent: Aug. 22, 1989

[54] WEEDLESS ROLL-OVER LURE APPARATUS AND METHOD

[76] Inventor: Phillip A. Rabideau, 3605 Fawn Creek Path, Austin, Tex. 78746

[21] Appl. No.: 163,303

[22] Filed: Mar. 2, 1988

[51] Int. Cl.⁴ .............................................. A01K 85/00
[52] U.S. Cl. .................................. 43/42.25; 43/43.28; 43/42.39
[58] Field of Search ................. 43/42.24, 42.25, 42.28, 43/42.29, 421, 42.39, 42.4, 42.37, 42.45

[56] References Cited

U.S. PATENT DOCUMENTS

| | | | |
|---|---|---|---|
| 1,265,900 | 5/1918 | Foss | 43/42.29 |
| 3,248,820 | 5/1966 | Lamar | 43/42.39 |
| 3,990,171 | 11/1976 | Davis | 43/42.28 |
| 4,149,334 | 4/1979 | Rogers | 43/42.25 |
| 4,367,607 | 1/1983 | Hedman | 43/42.1 |
| 4,713,907 | 12/1987 | Dudeck | 43/42.39 |

*Primary Examiner*—Kurt Rowan

*Attorney, Agent, or Firm*—J. Nevin Shaffer, Jr.

[57] ABSTRACT

A weedless roll-over lure with a weighted lure body with a rounded top and a flat bottom so that the weighted lure body, upon coming to rest, rolls over onto the flat bottom. A hook shank is incorporated into the lure body along the flat bottom. The hook shank has an eye in one end and a curved bend with a hook at the other that is bent towards the top of the weighted lure body. A protective, fish attracting, roll-over, shape, formed from a large number of filaments, is attached to the weighted lure body so that the hook, hook impaled bait and lure enhancements are protected from fouling. Further, the conical shaped protective form enhances the ability of the device to roll over in that the filaments are stiff and the conical shape forms a surface upon which the device will roll until the flat bottom is below the top. While providing protection of the bait and the hook from weeds, etc., the conical shaped filaments also act to slow the rate of descent of the device.

16 Claims, 1 Drawing Sheet

WEEDLESS ROLL-OVER LURE APPARATUS AND METHOD

BACKGROUND OF THE INVENTION

The recreational or sport fisherman has available a wide variety of weighted body artificial fishing lures that can be employed to attract and catch fish. One common family of weighted body lures is known as "jigs". Even though the configuration of the lure described in this disclosure could be classified as a "jig", it is demonstrated in this form only for convenience as its features can be adapted to other types of lures that utilize a weighted body.

Generally, a jig consists of a hook with a metal body cast around a hook with the eye of the hook, for line attachment, protruding at the leading end of the body and the hook shank and bend protruding out the rear of the body. There is usually some mechanism, e.g. socket in the body or collar around the hook shank, available to attach multiple strands of body filaments such as hair, feathers, rubber strands, etc. so that they surround the shank of the hook and extend beyond the bend of the hook. These body filaments simulate the body of fish forage, e.g. minnows, crayfish, etc. As the lure is erratically pulled through the water, the filament provides what can be described as a "swimming" action resulting from the alternate compacting and relaxing of the filament bundles due to water force generated as line retrieval force is alternatively applied and released. This "swimming" action is a desirable and sought after attribute for most types of fishing done with jigs.

Some known jigs attempt to be "weedless" by providing additional, somewhat stiff, protective members such as wire, a heavy plastic strand, or a bundle of filaments inserted in the jig head and so located as to attempt to protect the hook's barb from entanglement in weeds, brush, etc. These known attempts have not been successful in providing a truly "weedless" jig. One reason is that, when left to sink, most jigs known in the art will come to rest on the bottom haphazardly, usually lying on its side, with the hook barb subject to entanglement with weeds, brush and debris despite the presence of known "weedless" features.

Further, most jigs fall rapidly, head first, as the attached filaments known in the art do little to retard the rate of descent. In some instances it is more desirable to have a jig that descends relatively slowly.

It is also common for fisherman to enhance the fish-attracting capabilities of the common jig. One way is to dress or enhance the jig by threading a plastic twister tail grub or worm around the shank of the hook so it will trail behind the jig. Unfortunately, the plastic grubs and worms that are threaded on the jig's hook shank are easily dislodged from the preferred functional location away from the hook. In fact, enhancements used in this known manner actually foul the hook after the normal jig comes in contact with the bottom, brush, weeds, rocks, etc. which push the enhancement onto the hook. Fishermen also dress the jig by impaling live bait, e.g. minnows, worms, eels, etc., on the hook, but due to the aforementioned lack of protection, even bait is easily torn loose by weeds, brush, rocks, bottom debris, etc. and lost.

Thus, it is an object of this invention to provide an artificial weighted body fishing lure such as a "jig" that exhibits several exceptional properties. Some of these properties are as follows:

A lure whose body filaments not only provide the desired fish attracting "swimming" action, but which are uniquely constituted and arrayed in a unique conical fashion to make the lure inherently weedless by protecting the hook barb and any enhancements from debris;

A lure that, when in contact or at rest on the bottom, will tend to roll-over with the hook upwards due to the manner in which the conical body filament is arrayed in conjunction with the shape and weighting of the body;

A lure that will descend, without line tension, at a relatively slow rate due to the conical array of the body filaments;

A lure that has a bayonet inside a protective conical body filament arrangement for attaching fish attracting enhancements such as a twister tail grub or worm without impaling them on the shank of the hook; and A lure that protects live bait from entanglement and removal in brush and weeds when the bait is impaled on the bend of the hook.

SHORT STATEMENT OF THE INVENTION

Accordingly, the weedless roll-over lure of the present invention includes a lure body with a rounded top and flat bottom, and so weighted that the lure body, upon coming to rest, tends to roll over onto the flat bottom. Further, a hook is incorporated in the lure body in a way that makes it an integral part of the body and provides an eye for attaching a fishing line and a hook shank which protrudes and curves from the rear of the lure body back towards the top of the body. Additionally, the shank of the hook is encased in the lure body along the bottom of the lure body so as to contribute to the weight of the flat bottom. Further, a protective conically shaped shield, constructed of filaments, is attached to the lure body so that the hook barb, fish attracting enhancements and/or bait are protected from fouling. A socket is provided in the top of the lure body into which the apex of the protective shield is inserted for attachment. Further, the lure body has slanted sides that slant outwardly and upwardly from the flat bottom and meet with a rounded top surface of the top of the lure body so that if the lure comes to rest with the rounded top surface below the flat bottom, the combination of the weight concentrated at the flat bottom, the rounded top surface, the slanted sides and the conical shield cause the lure to roll over onto the lure body's flat bottom.

The conically shaped protective shield is created by means of a plurality of independent filaments. The independent filaments are formed together in an apex section, which is introduced to the socket for attachment. The preferred embodiment of the device arranges the plurality of independent filaments into a conical shape with a closed end at the apex and an open end opposite the apex so that the hook is surrounded with the plurality of independent filaments shaped in conical form and so that the conical form provides a flexible form upon which the lure rolls, as described above, until it comes to rest on the flat bottom.

An additional embodiment of the device includes a bayonet, secured to the apex of the conical shield section at one end, with a free end extending into and surrounded by the conical shape. The bayonet is used by attaching fish attracting enhancements to the bayonet. The enhancements attached to the bayonet are protected by the conical shape of the independent filaments and, therefore, are protected from coming into contact with weeds and the like and being pulled from the bayonet. An additional embodiment includes the combination of impaling the enhancement on the bayonet as well as the hook bend itself. This also helps retain the enhancement on the bayonet.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1A:
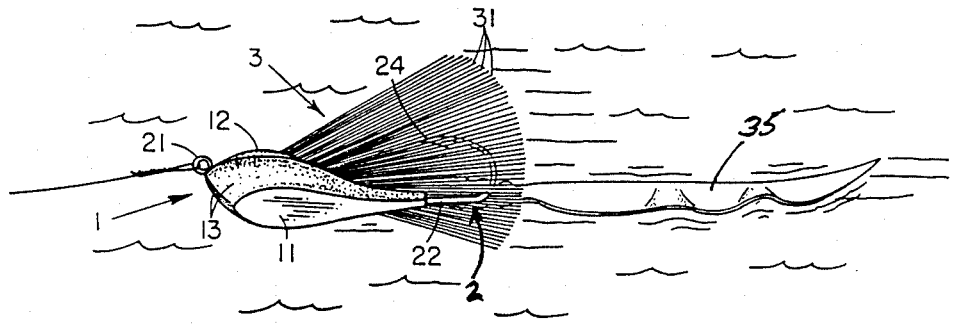
FIGS. 1a and 1b are isometric views of a preferred embodiment of the lure of the present invention in its general retrieval position and at rest on the bottom, respectively.
Figure 2B:
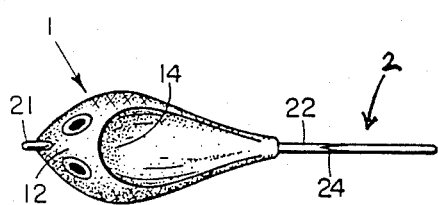
FIGS. 2a, 2b, 2c, 2d, and 2e are side, top, bottom, front-end and rear-end views, respectively, of the weighted lure body.
Figure 1B:
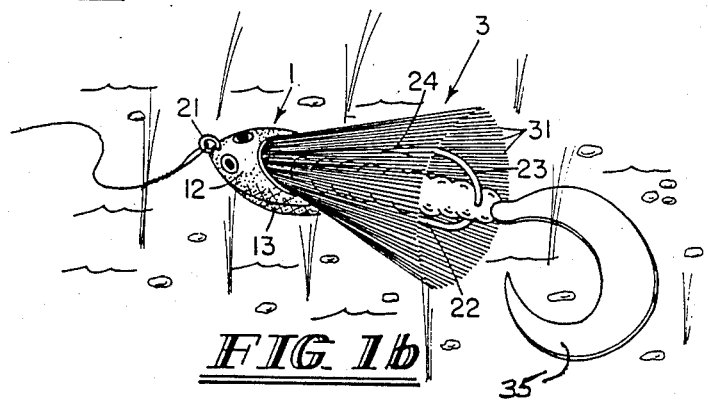
Figure 2A:
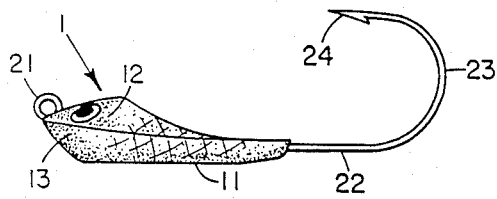
Figure 2D:
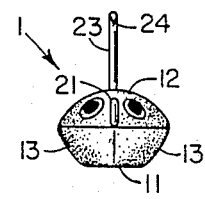
Figure 2E:
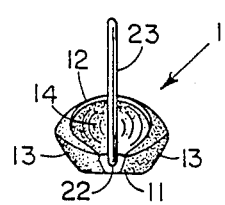
Figure 2C:
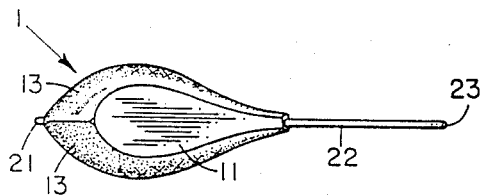

Referring to FIGS. 1a and 1b, the lure consists of three principal parts:

Part 1, the weighted body section that can be conveniently made of metal such as lead, tin, type metal, weighted plastic, etc. or of any compound known in the art with an overall specific gravity greater than 1.0, that is impervious to water and capable of withstanding abrasion;

Part 2, the hook with an eye 21 for attaching the fishing line, a shank 22, and bend 23 and a barb 24; and Part 3, a hollow, open-ended, conical shaped filament section with an integral bayonet stab 33. Part 3 has filaments 31 which are made of a somewhat stiff fibrous material. It has an apex 32 where the filaments are joined, and a bayonet 33 for attaching enhancements such as plastic twister tail grubs, etc.

FIGS. 2a, 2b, 2c, 2d, and 2e illustrate the shape and features of the weighted body 1 with its flat bottom 11, rounded top 12, slanted sides 13 and conical socket 14 under cutting the rounded top 12 for inserting the apex 32 of the filament section 3.

Figure 3B:
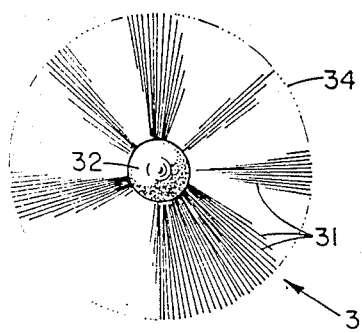
FIGS. 3a, 3b, and 3c are side, front and rear views, respectively, of the filament section.
Figure 3A:
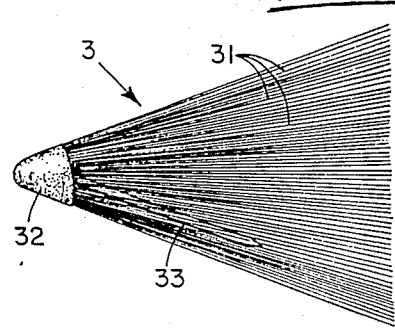
Figure 3C:
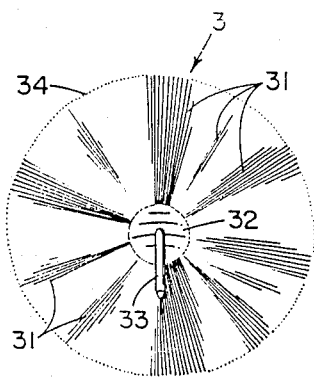

The general shape and construction of the filament section 3 is shown in FIGS. 3a, 3b, and 3c, and is a conical section with a high density outer perimeter. In this particular configuration, it is an open-ended hollow cone. The filaments can be of a stout fibrous material such as 0.008 inch diameter nylon or other material, such as rubber, strands which provide the resiliency necessary for the hollow conical configuration to serve as a weed guard for the hook, while protecting enhancements on the bayonet or bait impaled on the hook. The density of perimeter surface 34 of the conical filament section is critical, and these density requirements are met with the adoption of the hollow cone configuration. Importantly, because of the stiffness of the filaments, the conical configuration provides a round perimeter, substantially solid in appearance, by which the lure automatically rolls-over onto its flat bottom 11 regardless of how the lure lands on the bottom.

Figure 4:
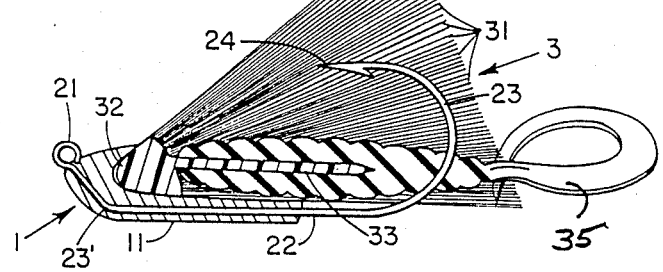
FIG. 4 is a cross-sectional side view of the present invention with a twister tail grub impaled on the bayonet and hook.

One end of the filaments are joined at the apex 32 by gluing or melting them together. The bayonet 33 can be an integral part of the filament section as shown in FIG. 4. The bayonet 33 is conveniently made out of stiff plastic or metal and is anchored internally, by glue or the like, at the apex 32. A plastic "twister tail grub" 35 is shown attached to bayonet 33. In this embodiment, the twister tail grub 35, or any other enhancement for that matter, is protected from being pulled off the bayonet by means of filaments 31. Additionally, as also illustrated in FIG. 4, the enhancement 35 may be impaled on hook 24 for double protection against being dragged or pulled off by rocks, weeds, etc.

Even though the filament section 3 is resilient enough to serve as a weed guard, as the lure is pulled through the water, the filaments bend inwards providing the aforementioned desirable fish attracting "swimming" action. Further, when the lure of the present invention is allowed to drop vertically, the conical filament section acts as a braking mechanism that advantageously retards the lure's rate of descent.

A key element of the present invention is the conical socket 14 that undercuts rounded top 12. Although the "conical" shape of socket 14 is not critical, i.e. it could be round, oval, etc., it is important that it undercut the rounded top 14 and provide a protective receptacle for attachments.

Further, as is obvious from FIGS. 1b, 2a, 2b, and 4, weighted body 1 with its flat bottom 11, rounded top 12, slanted sides 13 and conical socket 14, undercutting rounded top 12, is capable of receiving bayonet 33 without filaments 31. In this embodiment, weighted body 1 would be used as a jig head and bayonet stab 33 would be available, as in the preferred embodiment, for attaching lure enhancements such as plastic twister tail grub 35. Even without filaments 31, because of rounded top 12, weighted body 1 has an enhanced tendency to roll over onto flat bottom 11 and rest in an upright position.

While the present invention has been disclosed in connection with the preferred embodiment thereof, it should be understood that there may be other embodiments which fall within the spirit and scope of the invention as defined by the following claims.

What is claimed is:

1. A weedless roll-over lure comprising:
   A. A weighted lure body means with a top and a flat bottom so that said weighted lure body means, upon coming to rest, provides the weighting for said weighted lure body means to roll over onto said flat bottom;
   B. a hook means attached to said weighted lure body means;
   C. a fish attracting, protective and roll-over surface means attached to said weighted lure body that enables said lure body to roll over onto said flat bottom and that protects said hook means and lure enhancements;
   D. a socket undercutting said top into which said fish attracting, protective and roll-over surface means is inserted for attachment;
   E. slanted sides that slant outwardly and upwardly from said flat bottom; and
   F. a rounded top surface, of said top, connected to said slanted sides so that when said weighted lure body means comes to rest with said rounded top surfaces below said flat bottom, the combination of said weighted lure body means, said rounded top surface, said slanted sides, and said fish attracting, protective and roll-over surface means cause said weighted lure body to roll over onto said flat bottom.

2. The apparatus of claim 1 wherein said hook means further comprises:
   A. a shank section passing through said weighted lure body means under said socket;
   B. an eye formed from one end of said shank section located in said rounded top surface of said top so that connecting line means may be attached to said eye; and
   C. a bend with a hook, formed from another end of said shank curved in the direction of said rounded top surface of said top.

3. The apparatus of claim 2 wherein said fish attracting protective and roll-over surface means further comprises:
   A. a plurality of independent filament means; and
   B. an apex section where said plurality of independent filament means are joined and formed so as to conform to and just fit said socket in said top.

4. The apparatus of claim 4 wherein said fish attracting protective and roll-over surface means further comprises:
   A. an arrangement of said plurality of independent filament means into a conical shape with a closed end at said apex and an open end opposite said apex so that said hook, hook impaled bait and said lure enhancements are protected by said plurality of independent filament means in said conical shape, and so that said conical shape provides a flexible form around which said weighted lure body means rolls until said flat bottom is below said top; and
   B. a bayonet means secured to said apex at one end with a free end extending into and surrounded by said conical shape of said plurality of independent filament means for attachment of said lure enhancements.

5. The apparatus of claim 4 further comprising said lure enhancements attached to said bayonet means and to said hook so that retention of said lure enhancements is strengthened.

6. A weedless roll-over lure comprising:
   A. a weighted lure body means with a top and a flat bottom so that said weighted lure body means, upon coming to rest, provides the weighting for said weighted lure body means to roll over onto said flat bottom;
   B. a hook means attached to said weighted lure body means;
   C. a fish attracting, protective and roll-over surface means attached to said weighted lure body means so that said hook means and only lure enhancements are protected from fouling;
   D. a socket undercutting said top into which said fish attracting, protective and roll-over surface means is inserted for attachment;
   E. slanted sides that slant outwardly and upwardly from said flat bottom;
   F. a rounded top surface, of said top, connected to said slanted sides so that when said weighted lure body means comes to rest with said rounded top surface below said flat bottom, the combination of said weighted lure body means, said rounded top surface, said slanted sides and said fish attracting, protective and roll-over surface means cause said weighted lure body to roll over onto said flat bottom;
   G. a shank section passing through said weighted lure body means under said socket;
   H. an eye formed from one end of said shank section located in said rounded top surface of said top so that connecting line means may be attached to said eye;
   I. a bend with a hook, formed from another end of said shank curved in the direction of said rounded top surface of said top;
   J. a plurality of independent filament means forming said fish attracting protective means; and
   K. An apex section where said plurality of independent filament means are joined and formed so as to conform to and just fit said socket in said top.

7. The apparatus of claim 6 wherein said fish attracting, protective and roll-over surface means further comprising:
   A. an arrangement of said plurality of independent filament means into a conical shape with a closed end at said apex and an open end opposite said apex so that said hook, hook impaled bait and said lure enhancements are protected by said plurality of independent filament means in said conical shape, and so that said conical shape provides a flexible form around which said weighted lure body means rolls until said flat bottom is below said top; and
   B. a bayonet means secured to said apex at one end with a free end extending into and surrounded by said conical shape of said plurality of independent filament means so that enhancement means attached to said bayonet means for attachment of said lure enhancements.

8. The apparatus of claim 7 further comprising said lure enhancements attached to said bayonet means and to said hook so that retention of said lure enhancements is strengthened.

9. A method of providing a weedless roll-over lure comprising the steps of:
   A. constructing weighted lure body means with a top and a flat bottom so that said weighted lure body means, upon coming to rest, providing weighting for said weighted lure body means to roll over onto said flat bottom;
   B. attaching a hook means to said weighted lure body means;
   C. attaching a fish attracting, protective and roll-over surface means to said weighted lure body means that enables said lure body to roll over onto said flat bottom and that protects said hook means and any lure enhancements;
   D. constructing a socket undercutting said top and inserting said fish attracting, protective and roll-over surface means therein for attachment;
   E. constructing slanted sides that slant outwardly and upwardly from said flat bottom; and
   F. providing a rounded top surface connected to said slanted sides so that when said weighted lure body means comes to rest with said rounded top surface below said flat bottom, the combination of said weighted lure body means, said rounded top surface, said slanted sides, and said fish attracting, protective and roll-over surface means cause said weighted lure body means to roll over onto said flat bottom.

10. The method of claim 9 wherein attaching said hook means further comprises the steps of:

A. incorporating a shank section of said hook means in said weighted lure body means under said socket;

B. forming an eye from one end of said shank section and locating said eye in said rounded top surface of said top so that connecting line means may be attached to said eye; and C. forming a bend with a hook from another end of said shank and curving said bend and hook in the direction of said rounded top surface of said top.

11. The method of claim 10 wherein attaching a fish attracting, protective and roll-over surface means further comprises the steps of:

A. providing a plurality of independent filament means; and

B. joining said plurality of independent filament means into an apex section and formed so as to conform to and just fit said socket in said top.

12. The method of claim 11 wherein attaching said fish attracting, protective and roll-over surface means comprises the further steps of:

A. arranging said plurality of independent filament means into a conical shape with a closed end at said apex and an open end opposite said apex so that said hook, hook impaled bait and said lure enhancements are protected by said plurality of independent filament means in said conical shape and so that said conical shape provides a flexible form around which said weighted lure body means rotates until said flat bottom is below said top; and B. securing a bayonet means to said apex at one end with a free end extending into and surrounded by said conical shape of said plurality of independent filament means for attachment of said lure enhancements.

13. The method of claim 12 further comprising the step of attaching said lure enhancements to said bayonet means and to said hook so that retention of said lure enhancements is strengthened.

14. A method of providing a weedless roll-over lure comprising the steps:

A. constructing weighted lure body means with a top and a flat bottom so that said weighted lure body means, upon coming to rest, provides weighting for said weighted lure body means to roll over onto said flat bottom;

B. attaching a hook means to said weighted lure body means;

C. attaching a fish attracting, protective and roll-over surface means to said weighted lure body means so that said hook means and any lure enhancements are protected from fouling;

D. constructing a socket undercutting said top and inserting said fish attracting, protective and roll-over surface means therein for attachment;

E. constructing slanted sides that almost outwardly and upwardly from said flat bottom;

F. providing a rounded top surface connected to said slanted sides so that when said weighted lure body means comes to rest with said rounded top surface below said flat bottom, the combination of said weighted lure body means, said rounded top surface, said slanted sides, and said fish attracting, protective and roll-over surface means cause said weighted lure body means to roll over onto said flat bottom;

G. passing a shank section of said hook means through said weighted lure body means under said socket;

H. forming an eye from one end of said shank section and locating said eye in said rounded top surface of said top so that connecting line means may be attached to said eye;

I. forming a bend with a hook from another end of said shank and curving said bend and hook in the direction of said rounded top surface of said top;

J. providing a plurality of independent filament means so as to form said fish attracting, protective and roll-over surface means; and K. joining said plurality of said independent filament means into an apex section and formed so as to conform to and just fit said socket in said top.

15. The method of claim 14 wherein attaching said fish attracting, protective and roll-over surface means comprises the further steps of:

A. arranging said plurality of independent filament means into a conical shape with a closed end at said apex and an open end opposite said apex so that said hook, hook impaled bait and said lure enhancements are protected by said plurality of independent filament means in said conical shape and so that said conical shape provides a flexible form around which said weighted lure body means rotates until said flat bottom is below said top; and B. securing a bayonet means to said apex at one end with a free end extending into and surrounded by said conical shape of said plurality of independent filament means for attachment of said lure enhancements.

16. The method of claim 15 further comprising the step of attaching said lure enhancements to said bayonet means and to said hook so that retention of said lure enhancements is strengthened.

* * * * *